United States Patent Office 3,413,937
Patented Dec. 3, 1968

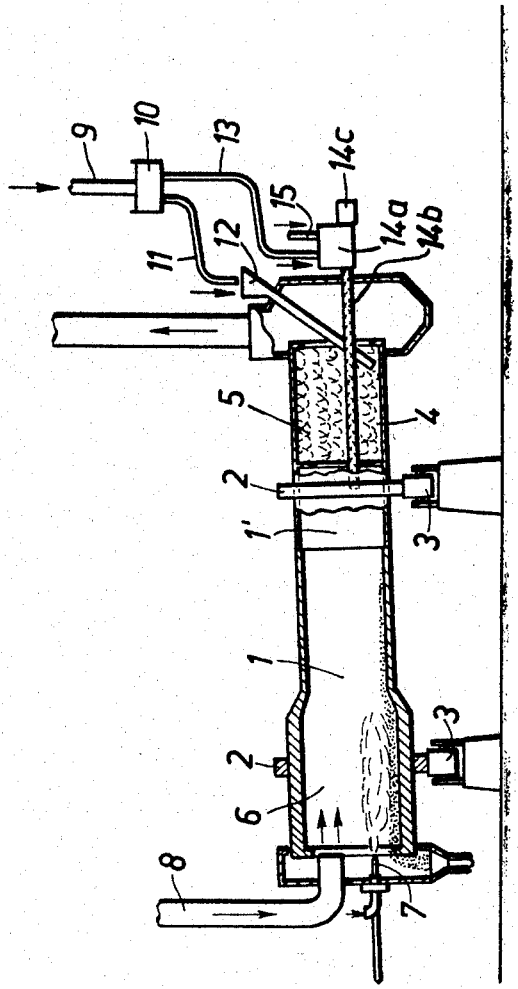

3,413,937
METHOD AND AN ARRANGEMENT FOR TREATING SEWAGE WASTES AND THE LIKE
Gustav Bojner and Gösta Bojner, Stockholm, Sweden, assignors to AB Torkapparater, Stockholm, Sweden, a Swedish joint-stock company
Filed May 23, 1967, Ser. No. 640,582
Claims priority, application Sweden, June 15, 1966, 8,184/66
7 Claims. (Cl. 110—14)

ABSTRACT OF THE DISCLOSURE

The waste material from a purification plant, which is a suspension of a sludge in a liquid, is divided in at least one liquid phase and one semifluid phase, and the liquid phase is utilized as a washing liquid for hot gases obtained from a combustion of the waste material, said liquid phase in the washing stage being heated and concentrated by the heat from the hot combustion gases and then being conducted into the heating stage, while the semifluid phase is conducted directly into the heating stage, where the two phases again are combined and together heated for drying and combustion.

---

The invention relates to a method and an arrangement for treating a suspension of sludge in a liquid by heating or evaporation in a heating stage and washing the hot gases of the heating stage in a washing stage, the sludge being such that it may cause evil odours especially when heated.

More particularly the invention refers to the heat treatment of the sewage wastes which are obtained from purification plants and have a content of sludge. Without any especial treatment, such as putrefaction or heating near to the boiling point, said wastes have very evil odours as they especially at elevated temperatures will evolve evil-smelling vapours or gases.

The invention has for its object to render possible an especial effective performing of the washing and the evaporation so that evil odours are counter-acted and the equipment is simplified. Further objects will appear from the following description.

The method according to the invention is characterized by dividing the suspension of the sludge in at least one liquid phase (a thin phase) and one semifluid phase (a thicker phase), conducting the liquid phase into the washing stage for washing the hot gases obtained from the heating stage, said liquid phase thereby being heated and concentrated by heat from said hot gases, then conducting the concentrated liquid phase into the heating stage, and conducting the semifluid phase directly into the heating stage, thus past the washing stage, the two phases again being combined in the heating stage, and being together heated in the heating stage for drying, and eventually combustion, if desired. It is possible to add to the semifluid phase, before the introduction into the heating stage, other material, for instance garbage or the like or other combustible material.

An arrangement for carrying out the method according to the invention is characterized by an apparatus for dividing the supplied suspension in at least one liquid phase (a thin phase) and one semifluid phase (a thick phase), said apparatus having an output conduit for the liquid phase in connection with the washing stage and another output conduit for the semifluid phase in direct connection with the heating stage.

The waste material of the type especially intended to in this connection, usually comprises only about 2–8% dry or solid matter and the rest water. Thus, as the water content usually is high and as the usual evil-smelling constituents are soluble in water, the hot gases obtained from the heating stage can be washed effectively by the thin phase which includes a very small amount of solid particles. However, the temperature of the washing liquid formed by the thin phase, should not be allowed to rise too high, say for instance not above 80° C. It should be understood that by utilization of the liquid phase as washing liquid in the manner set forth above, a very important economizing of the process is attained.

According to a preferred embodiment of the arrangement, when comprising a substantially horizontal rotatable drum, said drum is divided in three stages, viz. a washing stage at the input end for the liquid phase, a combustion stage at the opposite output end, and an intermediate drying stage, said combustion stage at said opposite end comprising means for maintaining the combustion, such as a burner or an inlet for supplying hot flue gases or both. In this way, the washing and the eliminating of evil odours, the drying and the combustion is performed in one and the same unit.

The invention will be explained in more detail in connection with the accompanying drawing which is an elevation, in part in vertical longitudinal section, of equipment for carrying out the method according to the invention in a preferred embodiment, illustrated by way of example.

As seen in the drawing, the equipment comprises substantially a rotary furnace or drum 1 which is surrounded by two rims or rings 2, each rolling on two supporting rollers 3. The driving means for imparting rotation to the drum may be of any well-known type and are not shown in the drawing. The drum is slightly inclined. The lower output end (to the left) which is the hot end and is somewhat enlarged, has a lining of refractory bricks or the like. In the higher input end of the drum, the washing stage 4 is formed, supplied with the liquid phase which is kept at a suitable level over the bottom portion of the drum. Preferably a heat exchanger 5 is provided in the washing stage. The heating of the output end in which a combustion space 6 is formed, can be effected by any suitable burning means 7, for instance an oil burner or a gas burner. Alternatively or additionally an inlet 8 can be provided for supplying hot flue gases from a furnace outside of the drum. The right-hand portion of the heating stage 1, immediately to the left of the washing stage 4, constitutes a drying stage 1'.

At the input end of the drum, there is provided an inlet 9 for the sewage waste, comprising a suspension of sludge and having a very low percentage dry or solid matter, and said inlet discharges into a concentrating apparatus 10 which has at least two outlets 11 and 13 and serves to divide the supplied sewage waste or suspension in at least one thin phase, viz. the liquid phase, which has a still lower percentage of solid or dry matter, for instance 0.5–2%, and is flowing out through the outlet 11, and one thick phase, viz. the semifluid or sludge phase, which has a corresponding higher content of solid matter and flows out through the outlet 13. The liquid phase is conducted through the funnel 12 into the washing stage 4 in order to absorb the evil-smelling matter and the dust in the hot gases obtained from the combustion, whereby the liquid phase is concentrated or thickened on account of the evaporation of water, while the hot gases flow through the washing stage (to the right in the drawing). The semifluid or sludge phase is conducted into an especial feeding device, comprising a container 14a, a screw conveyor 14b extending through the same, and an associated driving motor 14c. The screw conveyor 14b, which is enclosed in a sleeve or tube, constitutes a feeding channel extending through the washing stage 4 into the drying stage 1', and does not deliver any material in the washing stage 4. Only when delivered in the drying stage 1', the thicker sludge phase is recombined or mixed with the liquid phase arriving from the washing stage 4 but now being somewhat concentrated, said two recombined phases now being dried to the desired final percentage of moisture, and eventually combustion, if desired. During the rotation the charge of the drum is traveling through the same, to the left in the drawing, whereby the charge is successively dried or burned by the hot flue gases flowing to the right through the drum.

It is possible to provide the container 14a of the feeding device with an additional inlet 15 for other materials, such as garbage torn to pieces, or other combustible material. Thereby, the amount of combustible material in the combustion portion of the drum can be increased, if required. The provision of the additional inlet 15 has also a further advantage. In case the waste material to be treated would be so concentrated that it cannot be divided in the two different phases to the outlets 11 and 13, respectively, the waste material can be supplied to the inlet 15 and be conveyed directly to the stages 1' and 1 for drying and combustion, respectively. In such cases the washing stage 4 should be supplied with water as washing liquid and should be provided wtih an outlet for discharging such water in any convenient well-known way. Thus, the arrangement can be utilized in many different ways and according to different practical conditions.

As already pointed out, there is provided both an oil burner 7 supplying the heat required, and an inlet 8 for hot gases from another combustion, for instance flue gases having a temperature of about 800–1000° C. When the sludge material advanced through the drum, if desired together with garbage or the like from the inlet 15, has become sufficiently dry, it is ignited in the output end of the drum, and then it is burning perfectly during rotation of the drum. Therefore, in certain cases an especial burner can be omitted, but it is preferred to provide the oil burner 7 at least for igniting the dry material and the gases (methane) developed by the same during the heat treatment. It should be understood that it is possible to so adjust the supply of combustible material through the inlet 15, that the development of heat is sufficient for drying or concentrating the waste material, so that the total quantity is burned and only ashes are left in the combustion stage. It is also possible to provide for a balance between supply of heat and consumption of heat by regulating the supply of hot gases through the inlet 8 or by regulating the oil-burning at 7.

The heat exchanger 5 in the washing stage already mentioned can, in a preferred embodiment, be a rolling system of chains and scooping sheet metal strips or the like, which serve also to keep the internal wall of the drum free from sticky coatings or depositions which otherwise may be formed on account of the sticky nature of the sewage wastes. For instance, this heat exchanger can be of the structure disclosed by the United States Patent No. 3,333,837 issued on Aug. 1, 1967 (application Ser. No. 451,530 filed Apr. 28, 1965, by Gustav Bojner), where the chains are suspended in the form of loops in a rolling cage. Now, during the rotation the chains are moving through the washing liquid while being cooled and wetted, and then they are lifted up into the higher free space, where the hot gases pass (to the right in the drawing). The evil-smelling matter and the dust carried by the gases, is caught by the moisture on the chains and is washed away from the same during the rotation through the body of washing liquid on the bottom of the washing stage, whereby the concentration of solid matter in the washing liquids is increased on account of the evaporation of water. The scooping sheet metal strips or the like, when arranged, will continuously pour the washing liquid over the chains for effectively wetting the same.

The technical advance attained by the invention is very important because the invention renders it possible to dry, in a simple and effective way, sewage wastes or the like with a very low percentage of solid matter, with or without adding garbage or other combustible material, to any desired final degree of moisture or to complete dryness or to combustion, by utilization of the heat value of the solid matter and supplied hot gases from an external source or, and according to the demand, heat from an oil burner or the like, at the same time as the escaping gases are effectively washed from dust and evil-smelling matter, wherein all these operations can be performed in one single unit.

We claim:

1. A method of treating a suspension of a sludge in a liquid by heating in a heating stage and washing the hot gases of the heating stage in a washing stage, the sludge being such that it may cause evil odours, characterized by dividing the suspension in at least one liquid phase and one semifluid phase, conducting the liquid phase into the washing stage for washing the hot gases from the heating stage, said liquid phase being heated and concentrated by heat from said hot gases and then being conducted into the heating stage, and conducting the semifluid phase directly into the heating stage, thus past the washing stage, wherein the two phases again combined in the heating stage are together heated in the heating stage for drying and eventually combustion.

2. A method according to claim 1, characterized by mixing the semifluid phase with other materials before the introduction into the heating stage.

3. An apparatus for treating materials including a suspension of a sludge in a liquid, the sludge being such that it may cause evil odours, which comprises:
   an apparatus (10) for dividing supplied suspension in at least one liquid phase and one semifluid phase,
   means (1) constituting a heating stage for drying and eventual combustion of the materials:
   means (13, 14) for communicating the semifluid phase directly to the heating stage (1):
   means constituting a washing stage (4) for washing the hot gases of the heating stage;
   means (11, 12) for communicating the liquid phase to the washing stage so that said liquid phase washes the hot gases of the heating stage thus heating and concentrating said liquid phase; and
   means for then communicating said heated and concentrated liquid phase to said heating stage for drying and eventual combustion.

4. An apparatus according to claim 3, comprising a substantially horizontal rotatable drum divided into three sections, including a first section (4) at the input end forming the means constituting the washing stage, a second section (1) at the opposite output end forming the means constituting the heating stage, and an intermediate section forming an intermediate drying stage (1'), and wherein the means constituting the heating stage further includes burning means (7, 8) for maintaining the combustion.

5. An apparatus according to claim 3, characterized in that the apparatus (10) provided for dividing the suspension in at least one liquid phase and one semifluid phase, is a concentration apparatus with at least two outputs.

6. An apparatus according to claim 3, characterized in that said communicating means (13, 14) for the semifluid phase includes a feeding device (14a) with a feeding channel (14b) extending through the means constituting the washing stage (4) into the means constituting the heating stage (1) and delivering material only in the heating stage.

7. An apparatus according to claim 3 characterized in that said means (13, 14) for communicating the semifluid phase has an additional inlet (15) for other material.

References Cited

UNITED STATES PATENTS

| 1,743,080 | 1/1930 | Bradley et al. | |
|-----------|--------|----------------|--------|
| 3,306,237 | 2/1967 | Ransom | 110—14 |

JAMES W. WESTHAVER, *Primary Examiner.*